United States Patent
Bodenschatz et al.

(10) Patent No.: US 11,261,998 B2
(45) Date of Patent: Mar. 1, 2022

(54) METHOD FOR SWITCHING OVER A SOLENOID VALVE

(71) Applicant: Robert Bosch GmbH, Stuttgart (DE)

(72) Inventors: Dirk Bodenschatz, Stuttgart (DE); Erich Ludewig, Bietigheim-Bissingen (DE); Dirk Foerch, Neuenstadt/Stein (DE); Steffen Benzler, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 16/606,807

(22) PCT Filed: Apr. 5, 2018

(86) PCT No.: PCT/EP2018/058679
§ 371 (c)(1),
(2) Date: Oct. 21, 2019

(87) PCT Pub. No.: WO2018/210481
PCT Pub. Date: Nov. 22, 2018

(65) Prior Publication Data
US 2020/0378528 A1 Dec. 3, 2020

(30) Foreign Application Priority Data
May 17, 2017 (DE) ...................... 10 2017 208 273.9

(51) Int. Cl.
*F16K 31/06* (2006.01)
*F16K 47/02* (2006.01)
(Continued)

(52) U.S. Cl.
CPC .......... *F16K 47/02* (2013.01); *F16K 31/0675* (2013.01); *H01F 7/064* (2013.01);
(Continued)

(58) Field of Classification Search
CPC ........ F16K 31/0675; F16K 47/02; H01F 7/18; H01F 7/1844; H01F 7/064;
(Continued)

(56) References Cited

U.S. PATENT DOCUMENTS 6,234,150 B1 * 5/2001 Watanabe ............... F02D 41/40
123/490
6,332,454 B1 * 12/2001 Itabashi ............... F02D 41/062
123/490
(Continued)

FOREIGN PATENT DOCUMENTS

DE 10 2013 207 162 A1 10/2014
DE 10 2014 220 292 A1 4/2016
(Continued)

OTHER PUBLICATIONS

International Search Report corresponding to PCT Application No. PCT/EP2018/058679, dated Jul. 19, 2018 (German and English language document) (5 pages).

*Primary Examiner* — Matthew W Jellett
(74) *Attorney, Agent, or Firm* — Maginot, Moore & Beck LLP

(57) ABSTRACT

A method for switching over a solenoid valve having a movable valve body between a first position and a second position, wherein the method comprises at least the following method steps: a) adjusting a switching current to a pre-energization current intensity, in which the valve body remains in the present position, for a first time interval, and b) adjusting the switching current to a first switchover current intensity, which introduces a switchover movement of the valve body, for a second time interval.

14 Claims, 3 Drawing Sheets

(51) Int. Cl.
*H01F 7/06* (2006.01)
*H01F 7/18* (2006.01)
*B60R 16/023* (2006.01)
*B60T 15/02* (2006.01)

(52) U.S. Cl.
CPC .......... *H01F 7/1844* (2013.01); *B60R 16/023* (2013.01); *B60T 15/025* (2013.01)

(58) Field of Classification Search
CPC .. H01F 2007/1894; B60T 8/36; B60T 15/025; B60R 16/023; F02D 41/20; F02D 2041/2058; F02D 2041/2055; F02D 2041/2017
See application file for complete search history.

(56) References Cited

U.S. PATENT DOCUMENTS

| | | | | |
|---|---|---|---|---|
| 6,513,371 | B1 * | 2/2003 | Jett | F02M 59/366 |
| | | | | 73/114.42 |
| 7,621,259 | B2 * | 11/2009 | Mayuzumi | F02D 41/20 |
| | | | | 123/490 |
| 8,332,125 | B2 * | 12/2012 | Boee | F02D 41/20 |
| | | | | 701/103 |
| 9,938,924 | B2 * | 4/2018 | Nakano | F02D 41/38 |
| 10,161,339 | B2 * | 12/2018 | Kusakabe | F02D 41/20 |

FOREIGN PATENT DOCUMENTS

| | | | | |
|---|---|---|---|---|
| EP | 2 402 584 A1 | | 1/2012 | |
| JP | 2012-036886 A | | 2/2012 | |
| WO | WO-2016055214 A1 * | | 4/2016 | ........... F02D 19/024 |

* cited by examiner

METHOD FOR SWITCHING OVER A SOLENOID VALVE

This application is a 35 U.S.C. § 371 National Stage Application of PCT/EP2018/058679, filed on Apr. 5, 2018, which claims the benefit of priority to Serial No. DE 10 2017 208 273.9, filed on May 17, 2017 in Germany, the disclosures of which are incorporated herein by reference in their entirety.

BACKGROUND

Valves are known for a very wide range of application areas, which can be switched by means of electrical signals. In particular, solenoid valves are known that can be switched by changing magnetic forces, in particular. When switching solenoid valves, however, undesirable noise is normally produced.

SUMMARY

A particularly advantageous method for switching over a solenoid valve is presented. The disclosed embodiments specify particularly advantageous developments of the method.

In particular, the solenoid valve described can be used in particular in a braking system of a motor vehicle. It is also conceivable, however, for the solenoid valve described to be used in any other application area.

The solenoid valve has a movable valve body which is adjustable at least between a first position and a second position. The solenoid valve can be constructed in such a way that the solenoid valve is closed in the first position of the valve body and is open in the second position of the valve body. It is equally possible, however, that the solenoid valve is open in the first position of the valve body and closed in the second position of the valve body.

The setting of the solenoid valve can be described, in particular, via the position of the valve body. Consequently, a first position of the solenoid valve corresponds to the first position of the valve body and a second position of the solenoid valve corresponds to the second position of the valve body. Between the first position and the second position of the valve body (or the solenoid valve) there are preferably, but not necessarily, no (defined) intermediate positions. If there are no intermediate positions provided, the solenoid valve can be only (completely) open or (completely) closed. Intermediate positions are only present very briefly when switching between the open state and the closed state.

The solenoid valve can have, for example, a channel between an inlet and an outlet. At the inlet a medium can flow into the channel (and thus into the solenoid). The channel can be blocked or released by the valve body—depending on the position of the valve body. In one of the positions of the solenoid valve the channel is released, so that the solenoid valve is open. In this case, the medium can flow out through the channel past the valve body to the outlet and thus out of the solenoid valve. If the valve body blocks the channel, on the other hand, the solenoid valve is closed and the medium cannot flow out of the solenoid valve or out of the outlet.

The valve body can be adjusted in the solenoid valve, in particular by means of magnetic forces. The valve body is preferably designed to be at least partially magnetic so that the magnetic forces can act on the valve body. Alternatively, however, the magnetic forces, can also act on a magnetic element connected to the valve body. In this case, the valve body can also be designed non-magnetic. The magnetic forces are preferably generated by one or more electrical coils (which can also be referred to as electromagnets). The magnetic forces here depend on a current flow through the one or more electrical coils. Where in the following a current intensity is described, this means the current intensity of a current flow through the one or more electrical coils.

Preferably, the valve body is mounted in such a way that the valve body is translationally adjustable. The magnetic forces in this case are preferably directed in a first direction. On the other hand, a restoring force preferably acts on the valve body in a second direction opposite to the first direction. The restoring force can be generated in particular by a spring. Depending on the current intensity (of a current through the one or more electrical coils) either the magnetic force (so that a total force results in the first direction) or the spring force predominates (so that a total force results in the second direction).

Preferably, the valve body is adjustable between a first stop and a second stop. The valve body preferably bears against the first stop in the first position and preferably against the second stop in the second position. The valve body may, in particular, by a corresponding holding current intensity. For example, the valve body can be held in one of the positions by a first holding current intensity of zero being applied. This means that only the restoring force acts, which presses the valve body against the corresponding stop. Likewise, the first holding current intensity can also be non-zero, but dimensioned to such a small value that the restoring force outweighs the magnetic forces. In the other position, the valve body can be held with a second holding current intensity, different from zero, which counteracts the restoring force of a larger opposing magnetic force, so that the valve body is held at the corresponding stop.

To switch over the solenoid valve between the first position and the second position (i.e. from the first position to the second position or from the second position to the first position), the current flowing through the one or more electrical coils is changed. The current flowing through the one or more of the electrical coils during the switchover or to switch over should be referred to here as a switching current. The switching current can also have the current intensity of zero.

In step (a) of the described method, the switching current is set to a pre-energization current intensity for a first time interval, in which the valve body remains in the present position.

That the valve body remains in the present position means that the pre-energization current is too weak to cause switching of the solenoid valve. If the valve body is in the first position, for example, before the switchover in accordance with the described method, the valve body remains in the first position even when the switching current is set to the pre-energization current.

The first time interval preferably has a length in the range from 1 to 100 milliseconds, in particular in the range from 5 to 10 milliseconds.

In step b) of the described method, the switching current is set to a first switchover current for a second time interval, which initiates a switchover movement of the valve body.

The first switchover current intensity is in particular dimensioned in such a way that the total force consisting of the magnetic force generated by the one or more electrical coils and the restoring force acts in the direction in which the valve body must be moved in order to switch over.

When the solenoid valve is switched over from the open position of the solenoid valve into the closed position of the solenoid valve the first switchover current intensity can be, in particular, a first closing current intensity. When the solenoid valve is switched over from the closed position of the solenoid valve into the open position of the solenoid valve the first switchover current intensity can be, in particular, a first opening current intensity.

By setting the switching current to the pre-energization current it is possible to ensure that the directly following switchover process (which is initiated in step b) by applying the first switchover current intensity) proceeds in a particularly reliable way. In particular, the switchover process can be independent of supply voltage fluctuations or supply current intensity. For example, if the switching current were switched over immediately from the holding current intensity to the first switchover current intensity, a wide range of effects such as induction can lead to the switchover current only reaching the first switchover current intensity after a time delay. In particular, the temporal characteristic of the switching current is flattened out in such a way that the switching current does not change abruptly from the holding current intensity to the first switchover current intensity (as desired), but changes continuously. In the case of such a flattened characteristic of the switching current, the switching current is applied with the first switchover current intensity only over a part of the first time interval. For a switching of the solenoid valve this part of the first time interval may be too short. In order to take account of a flattened curve of the switching current, in principle it is possible to extend the first time interval appropriately. It should be noted, however, that the switching current can be flattened differently under different conditions. A wide range of influencing factors from the supply voltage network on the supply voltage, and therefore also on the switching current, can cause the switching current to be flattened in different ways in different operating situations of the supply voltage network. In order, nevertheless, to achieve a particularly reliable switchover, the switching current is first set to the pre-energization current intensity. This means that the jump to the first switchover current intensity is particularly small, so that a flattening of the characteristic of the switching current can only occur over a very short period of time and therefore can only have a very low impact on the switching of the solenoid valve.

The solenoid valve is preferably connected to a control device which is intended and configured for carrying out the described method. The control unit preferably has, in particular, one input, via which a request for switching the solenoid valve can be received. The input can comprise a user interface for operation by a user and/or an interface for connecting to an electronic system. In particular, the control device can be connected to a set of electronics of a motor vehicle. Furthermore, the control device is preferably connected to the one or more electrical coils of the solenoid valve, wherein by means of the control device the current through the one or more electrical coils can be specified.

In a preferred embodiment of the method the second time interval is chosen in such a way that the switchover of the solenoid valve has not yet been completed after the second time interval.

When switching over the solenoid valve, the valve body can be accelerated, in particular over the entire second time interval. The longer the second time interval lasts, i.e. the longer the acceleration of the valve body by the switchover current intensity lasts, the greater will be the speed of the switchover movement of the valve body, i.e. the speed with which the valve body is moved from the first position to the second position or from the second position to the first position. If the valve body strikes the corresponding stop with a particularly high speed, this can be heard as an unpleasant loud noise (in particular as a bang). In order to prevent or at least reduce the production of such an impact noise at the impact of the valve body on a stop, the switchover current intensity is applied only over the second time interval, which is dimensioned in such a way that the switchover of the solenoid valve has not yet been completed after the second time interval. Preferably, the acceleration of the valve body using the switchover current intensity only takes place as long as necessary for switching over. After the end of the second time interval, the valve body can continue to move, in particular due to inertia in the direction of the corresponding stop, even without further acceleration, so that the switchover operation can be completed after the second time interval.

In a preferred embodiment the method also comprises the following method step:

c) adjusting the switching current to a damping current intensity, which adjusts the speed of the switchover movement, for a third time interval.

The noise generation can in particular be prevented particularly successfully, or at least reduced, by the valve body being braked before striking the corresponding stop. This can take place in particular according to step c). The damping force intensity is preferably (in particular also in conjunction with the switchover current intensity, the duration of the second time interval and the third time interval) dimensioned in such a way that the valve body accelerated according to step b) reaches the relevant stop with a particularly low speed, so that a particularly low level of noise is produced.

In a further preferred embodiment of the method the solenoid valve can be switched over from the first position to the second position due to the presence of the switching current with a current intensity above an upper limiting current intensity, wherein the pre-energization current intensity is below the upper limiting current intensity.

If a current with the upper limiting current intensity flows through the one or more electrical coils, there is a force equilibrium between the restoring force and the magnetic forces. In the case of a current intensity above the upper limiting current intensity, the valve body is preferably in the second position or is moved into the second position (in particular if the valve body was previously in the first position and such a current intensity has not yet been present for a sufficiently long time).

The fact that the pre-energization current is below the upper limiting current intensity is particularly useful when the solenoid is switched over from the first position to the second position. As a result, the switchover of the solenoid valve is not yet initiated by the pre-energization current intensity. Even when switching from the second position to the first position, it makes sense to choose the pre-energization current at least below the upper limiting current intensity. Otherwise, when adjusting the first switchover current intensity a particularly large and thus particularly unfavorable jump would occur in the switching current (which, in particular, can lead to a particularly severely flattened profile of the switching current).

In another preferred embodiment of the method, the pre-energization current intensity is at least 90%, preferably at least 95%, of the upper limiting current intensity.

In this embodiment, the pre-energization current is chosen slightly below the upper limiting current intensity. This is particularly useful when the solenoid is switched over from the first position to the second position. Such a choice of pre-energization current intensity means that although switching of the solenoid valve from the first position to the second position is not yet initiated, the pre-energization current is already close to the upper limiting current intensity required for such a switchover. Therefore when setting the first switchover current intensity, a particularly small jump in the switching current occurs.

In a further preferred embodiment of the method the solenoid valve can be switched over from the second position to the first position due to the presence of the switching current with a current intensity below a lower limiting current intensity, wherein the pre-energization current intensity is above the lower limiting current intensity.

If a current with the lower limiting current intensity flows through the one or more electrical coils, a force equilibrium exists between the restoring force and the magnetic forces. In the case of a current intensity below the lower limiting current intensity, the valve body is preferably in the second position or is moved into the second position (in particular if the valve body was previously in the second position and such a current intensity has not yet been present for a sufficiently long time).

The upper limiting current intensity and the lower limiting current intensity are preferably spaced apart from each other. This can be the case, in particular, if the magnetic force is differently pronounced in the first position and in the second position of the valve body. This may be due to the fact that the valve body is arranged at a different distance from the one or more electrical coils in the first position and the second position. At one of the stops or at both stops a retaining element for the valve body can also be provided. For example, a projection on the valve body at the stops can engage in a respective groove as a retaining element. It is also conceivable, however, that the upper limiting current intensity and the lower limiting current intensity coincide.

The fact that the pre-energization current is above the upper limiting current intensity is particularly useful when the solenoid is switched over from the second position to the first position. As a result, the switchover of the solenoid valve is not yet initiated by the pre-energization current intensity. Even when switching from the first position to the second position, it makes sense to choose the pre-energization current at least above the lower limiting current intensity. Otherwise, when adjusting the first switchover current intensity a particularly large and thus particularly unfavorable jump would occur in the switching current (which, in particular, can lead to a particularly severely flattened profile of the switching current).

In another preferred embodiment of the method the pre-energization current amounts to a maximum of 110% of the lower limiting current intensity.

In this embodiment, the pre-energization current is chosen slightly above the lower limiting current intensity. This is particularly useful when the solenoid is switched over from the second position to the first position. Such a choice of pre-energization current intensity means that although switching of the solenoid valve from the second position to the first position is not initiated, the pre-energization current is already close to the lower limiting current intensity required for such a switchover. Therefore a particularly small jump in the switching current occurs when the first switchover current intensity is set.

In a further preferred embodiment the method also comprises the following method step:
d) adjusting the switching current to a second switchover current intensity, which ensures that a switchover of the solenoid valve is carried out.

Switching the solenoid valve according to the steps a) to c) of the described method can be carried out, as described previously, with a particularly low level of noise production. To do so, the valve body strikes the stops with a particularly low speed. Such a switchover of the valve body at low speeds can result in a switchover not being fully executed, so that—undesirably—the valve body is not changed over by the switching operation. In particular, this may be due to the fact that in the event of a switchover in accordance with steps a) to c) of the described method, even small external influencing factors can continue to slow down the valve body beyond the deceleration in accordance with step c), so that the speed of movement of the valve body is no longer sufficient to reach the appropriate stop. Possible external influences here are, for example, magnetic forces that slow down the valve body. Also, the valve body may be slowed down due to friction on components of the solenoid valve (such as a receptacle, within which the valve body is movably mounted).

By step d) a switching of the valve can be carried out in the case that the valve body—undesirably—was not changed over by the switchover operation in accordance with the steps a) to c) and, in particular, in accordance with step b). To this end, following step c) the second switchover current is applied in accordance with step d). If the valve body is moved from the first position into the second position, the second switchover current intensity is preferably higher than the first switchover current intensity, but at least above the upper limiting current intensity. If the valve body is moved from the second position into the first position, the second switchover current intensity is preferably below the first switchover current intensity, but at least below the lower limiting current intensity.

The fourth time interval is preferably (in particular in conjunction with the second switchover current) chosen long enough that a switchover of the solenoid valve (if this has not already been carried out in accordance with steps a) to c) as desired) is very likely to take place. It is also possible that the fourth time interval is unbounded, so that the second switchover current is applied long enough so that the solenoid valve is switched over again. This can be the case, in particular, if a current intensity of zero is selected both for the second switchover current and for the first holding current intensity.

When the solenoid valve is switched over from the open position of the solenoid valve into the closed position of the solenoid valve the second switchover current intensity can be, in particular, a second closing current intensity. When the solenoid valve is switched over from the closed position of the solenoid valve into the open position of the solenoid valve the second switchover current intensity can be, in particular, a second opening current intensity.

In another preferred embodiment of the method, a setting of the solenoid valve is monitored, at least for the duration of step d).

Preferably, the setting of the solenoid valve is monitored in such a way that the position of the valve body (for example, as a distance from the first stop and/or from the second stop) is detected. Alternatively, it is preferably detected whether the valve body is in the first position or the second position. The setting of the solenoid valve can be monitored, in particular, by means of a sensor on the solenoid valve. The sensor is preferably connected to the control device.

The monitoring in step d) (monitoring of the position of the valve body) may be carried out, in particular, by monitoring a current gradient. In particular, the switching of the solenoid valve can be detected from the time characteristic of the current through the electrical coil. This is carried out by distinguishing between an idealized time characteristic of the current and an actual time characteristic of the current. For example, if a voltage is applied or increased abruptly on the electrical coil, then in an idealized model the current flowing through the coil increases abruptly. In fact, due to self-induction in the electrical coil, however, a delayed increase in the current occurs. The current rises in particular according to an exponential function and approaches the value to which the current would have jumped immediately in an idealized model.

The valve body is preferably designed to be at least partially magnetic and/or connected to a magnetic element, on which the magnetic forces of the electrical coil can act. The magnetic valve body or the magnetic element are preferably located at least partially in the magnetic field that has been generated by the electrical coil. The magnetic permeability of the magnetic valve body or the magnetic element affects the magnetic field generated by the electrical coil, or the current flowing through the electrical coil. As the valve body moves, induction causes the current through the electrical coil to be affected. In particular, due to the basic principle of electromagnetic induction, the moving valve body can induce a current in the coil, which causes a magnetic field that opposes the movement of the valve body. In particular, this means that the current flowing through the electrical coil when being increased to the second switchover current intensity upon movement of the valve body (i.e., in particular in the case of a switchover of the solenoid valve) is attenuated. This is expressed as an artefact in the temporal characteristic of the current through the electrical coil. Thus, a switchover of the valve body can be detected from the temporal characteristic of the current.

The monitoring of the solenoid valve setting for the duration of step d) (i.e. in particular within the fourth time interval) can preferably be used to detect whether a switchover of the solenoid valve has taken place as desired in accordance with the steps a) to c) and, in particular, in accordance with step b), or whether the switching of the solenoid valve only took place in step d).

In a further preferred embodiment of the method a multiplicity of similar switching operations is performed, wherein in a subsequent switching operation the valve body is accelerated at an increased rate in the second time interval, if a switchover of the solenoid valve was detected in at least one previous switching operation in step d).

In a further preferred embodiment of the method, a multiplicity of similar switching operations is performed, wherein in a subsequent switching operation the valve body increases accelerated at a lower rate in the second time interval, if no switchover of the solenoid valve was detected in at least one previous switching operation in step d).

A multiplicity of similar switching operations is to be understood in particular to mean that the solenoid valve is switched repeatedly back and forth between the first position and the second position, without any further changes to the solenoid valve being performed. In particular, a switchover from the first position to the second position can be identical to a switchover from the second position to the first position. If a multiplicity of similar switching operations is carried out, parameters of the method described above can be iteratively improved (i.e., for example, from one switching operation to the next switching operation), by one or more of the previous switching operations being evaluated. In the two present embodiments this can be achieved by the fact that the acceleration that the valve body undergoes in step b) (i.e. in the second time interval), is iteratively adjusted.

The acceleration of the valve body can be enhanced, in particular, by increasing the second time interval and can be reduced by reducing the second time interval. Alternatively or additionally, the acceleration of the valve body can be adjusted by adjusting the first switchover current intensity. When switching from the first position into the second position, the acceleration of the valve body can be enhanced by increasing the first switchover current intensity. When switching from the second position into the first position, the acceleration of the valve body can be enhanced by decreasing the first switchover current intensity.

The acceleration of the valve body by means of step b), on the one hand, is preferably extremely small, so that the noise generated (by the valve body hitting the corresponding stop) is extremely small. On the other hand, the acceleration of the valve body by means of step b) is preferably at least so large that this is sufficient for switching over the solenoid valve (so that it is not the case that the switchover only occurs in step d)). In accordance with these two present embodiments, the acceleration of the valve body be adjusted iteratively, so that an acceleration can be found, for which on the one hand, switching takes place in accordance with steps a) to c), but on the other hand, any noise produced is extremely small.

If in the multiplicity of the switching operations it is detected that a switchover regularly only takes place in step d), the acceleration of the valve body is preferably enhanced so that for subsequent switching operations the switching takes place more often, as required in accordance with steps a) to c) and, in particular, in accordance with step b).

If in the multiplicity of the switching operations it is detected that switching never only takes place in step d) or only very rarely, the acceleration of the valve body is preferably reduced, resulting in a particularly low noise production.

The reduction or enhancement of the acceleration is preferably achieved by an adjustment of the first switchover current intensity.

In particular, the iterative adjustment can be carried out by the control device. For this purpose, the control device is preferably provided, in particular, with information relating to the acceleration of the valve body (that is, preferably in particular, the size of the first switchover current intensity, the duration of the second time interval and the information as to whether a switching of the solenoid valve has taken place in step d)) in the individual switching operations. With appropriate software installed on the control device it can be determined from this information how the acceleration should be selected for a subsequent switching operation, wherein in particular, the size of the first switchover current intensity and the duration of the second time interval for the following switching operation are specified.

As a further aspect a control device is presented, wherein the control device is configured for carrying out the method described. In addition a computer program is presented, which is configured for carrying out the method described. Furthermore, a machine-readable storage medium is presented on which the computer program is stored. The particular advantages and design features of the method described above are applicable and transferable to the control device, the computer program and the machine-readable storage medium.

BRIEF DESCRIPTION OF THE DRAWINGS

Further details of the disclosure and an exemplary embodiment, to which the disclosure is not limited however, are described in greater detail on the basis of the drawings. Shown are.

DETAILED DESCRIPTION

Figure 1:
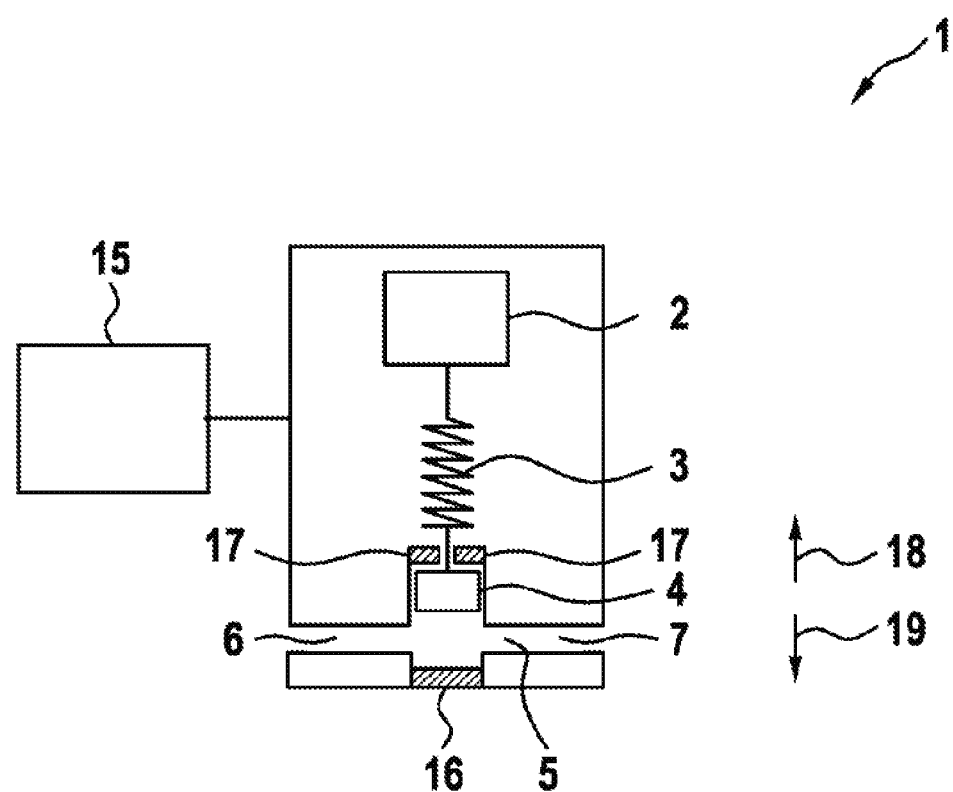
FIG. 1: a schematic illustration of a solenoid valve.

FIG. 1 shows a solenoid valve 1 with a valve body 4, which is adjustable between a first stop 16 and a second stop 17. At the first stop 16 the valve body 4 is located in a first position. At the second stop 17 the valve body 4 is located (as shown in this drawing) in a second position. The solenoid valve 1 has a channel 5 between an inlet 6 and an outlet 7. The channel 5 is released in the second position (shown here) of the valve body 4, so that the solenoid valve 1 is open. In this case, a medium can flow out from the inlet 6 through the channel 5 past the valve body 4 to the outlet 7 and thus out of the solenoid valve 1. If the valve body 4 blocks the channel, on the other hand, the solenoid valve 1 is closed and the medium cannot flow out of the solenoid valve 1 or out of the outlet 7. In the solenoid valve 1 an electrical coil 2 is arranged, which—depending on the current flow through the electrical coil—exerts a magnetic force on the valve body 4 in a first direction (here upwards). The valve body 4 is connected to a spring 3, which exerts a force on the valve body 4 in a second direction 19 (here downwards). The solenoid valve 1 is connected to a control unit 15 via which the solenoid valve 1 can be switched over. To do so, the electrical current shown in FIGS. 2 and 3 is passed through the electrical coil 2.

Figure 2:
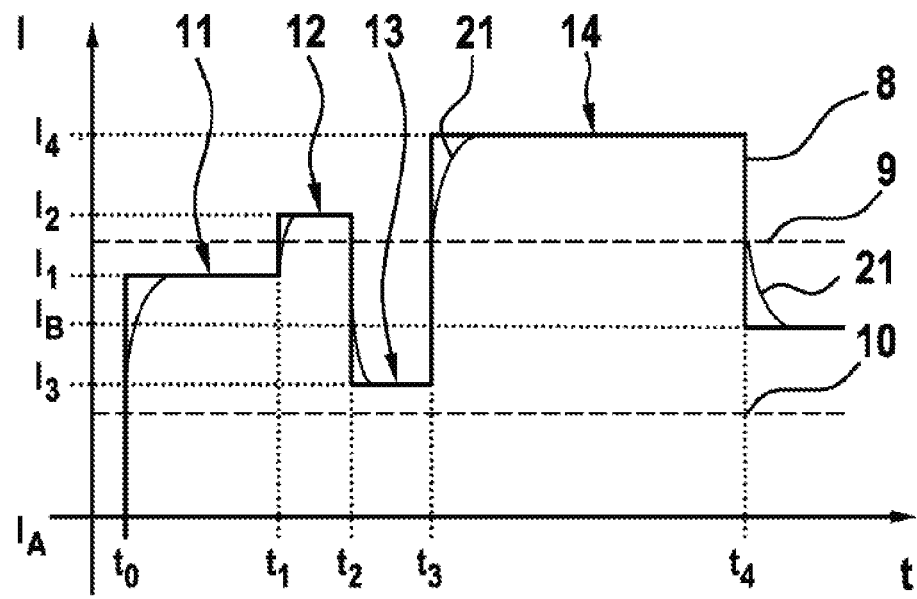
FIG. 2: a schematic waveform of a switching current when the solenoid valve of FIG. 1 switches over from a first position to a second position.
Figure 3:
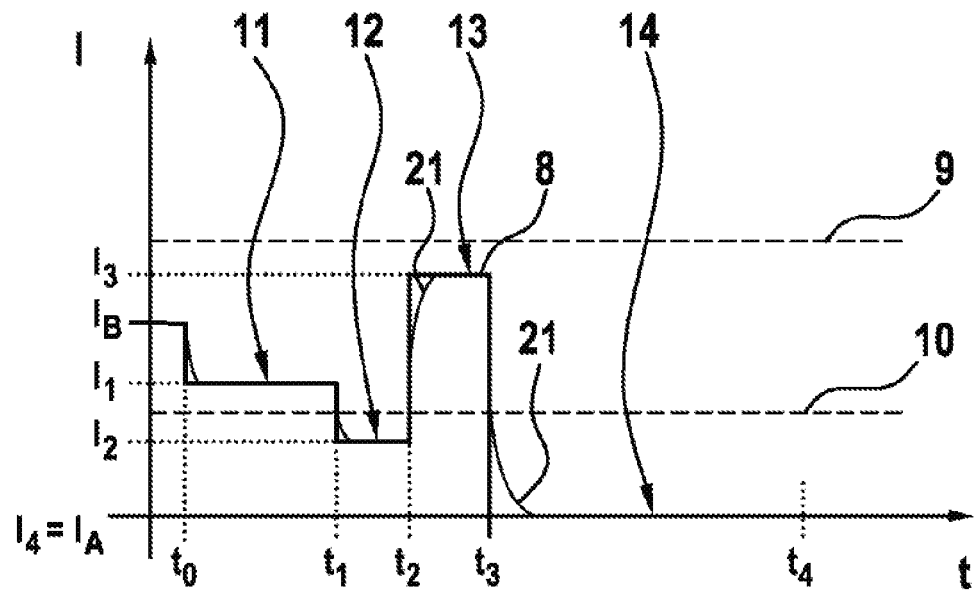
FIG. 3: a schematic waveform of a switching current when the solenoid valve of FIG. 1 switches over from the second position to the first position.

FIGS. 2 and 3 each show a current intensity I plotted against time t (in arbitrary units in both cases). Shown is the time characteristic of a switching current 8 for switching over the solenoid valve 1 from FIG. 1 from the first position into the second position (FIG. 2) or from the second position into the first position (FIG. 3). The switching current 8 is shown in idealized form. In addition, with a thinner line compared to the switching current 8, a real switching current 21 is shown, in which changes due to self-induction occur only after a time delay. The first position is assigned a first holding current intensity $I_A$ and the second position is assigned a second holding current intensity $I_B$. Also shown is an upper limiting current intensity 9, wherein the solenoid valve 1 can be switched over from the first position to the second position due to the presence of the switching current 8 with a current intensity above the upper limiting current intensity 9. In addition, a lower limiting current intensity 10 is drawn, wherein the solenoid valve 1 can be switched over from the second position to the first position due to the presence of the switching current 8 with a current intensity below the lower limiting current intensity 10.

FIG. 2 shows the switchover of the solenoid valve 1 from the first position to the second position. The solenoid valve 1 is in the first position up to a start time $t_0$. To this end, the first holding current intensity $I_A$ is applied. In a first time interval 11 between the start time to and a first time $t_1$, the switching current 8 is set to a pre-energization current intensity $I_1$, in which the valve body 4 remains in the present position (that is, in the first position). The pre-energization current intensity $I_1$ is below the upper limiting current intensity 9. In addition, the pre-energization current intensity $I_1$ amounts to 90% of the upper limiting current intensity. In particular, it should be noted that for the sake of clarity, FIG. 2 is only schematic and not exactly to scale. Between the first time $t_1$ and a second time $t_2$, in a second time interval 12, the switching current 8 is set to a first switchover current intensity $I_2$, which initiates a switchover movement of the valve body 4. The length of the second time interval 12 is chosen in such a way that the switchover of the solenoid valve 1 has not yet been completed after the second time interval 12. Between the second time $t_2$ and a third time $t_3$, in a third time interval 13 the switching current 8 is set to a damping current intensity $I_3$, which adjusts, in particular reduces, a speed of the switchover movement. This can reduce noise produced on the impact of the valve body 4 on the second stop 17. Between the third time $t_3$ and a fourth time $t_4$, in a fourth time interval 14, the switching current 8 is set to a second switchover current intensity $I_4$, which ensures that a switchover of the solenoid valve 1 has taken place. After the fourth time $t_4$ the solenoid valve 1 is in the second position. Therefore, the second holding current intensity $I_B$ is applied.

FIG. 3 shows the switchover of the solenoid valve 1 from the second position into the first position is shown. The solenoid valve 1 is in the first position up to a start time to. To this end, the second holding current intensity $I_B$ is applied. In a first time interval 11 between the start time to and a first time $t_1$, the switching current 8 is set to a pre-energization current intensity $I_1$, in which the valve body 4 remains in the present position (that is, in the second position). The pre-energization current intensity $I_1$ is above the upper limiting current intensity 10. In addition, the pre-energization current intensity $I_1$ amounts to 110% of the upper limiting current intensity. In particular, it should be noted that for the sake of clarity, FIG. 3 is only schematic and not exactly to scale. Between the first time $t_1$ and a second time $t_2$, in a second time interval 12, the switching current 8 is set to a first switchover current intensity $I_2$, which initiates a switchover movement of the valve body 4. The length of the second time interval 12 is chosen in such a way that the switchover of the solenoid valve 1 has not yet been completed after the second time interval 12. Between the second time $t_2$ and a third time $t_3$, in a third time interval 13 the switching current 8 is set to a damping current intensity $I_3$, which adjusts, in particular reduces, a speed of the switchover movement. This can reduce noise produced on the impact of the valve body 4 on the first stop 16. Between the third time $t_3$ and a fourth time $t_4$, in a fourth time interval 14, the switching current 8 is set to a second switchover current intensity $I_4$, which ensures that a switchover of the solenoid valve 1 has taken place. After the fourth time the solenoid valve 1 is in the first position. Therefore, the first holding current intensity $I_A$ is applied. Both the second switchover current intensity $I_4$ and the first holding current intensity $I_A$ here are equal to zero. This means that the valve or the valve body is held in the first position (only) by the restoring force and the magnet exerts no forces in the first position. The fourth time interval 14 and the fourth time $t_4$ are nevertheless drawn here, in order to make a clear comparison with FIG. 2.

Both when the solenoid valve 1 is switched over from the first position into the second position (FIG. 2) and when the solenoid valve 1 is switched from the second position to the first position (FIG. 3) a setting of the solenoid valve 1 is monitored during the fourth time interval 14. If a multiplicity of similar switching operations is carried out, in a subsequent switching process the valve body 4 can be accelerated more strongly in the second time interval 12, if in a previous switching operation a switchover of the solenoid valve 1 was not detected until the fourth time interval 14. If, on the other hand, no switching is detected in the fourth time interval 14, in a subsequent switching operation the valve body 4 can be accelerated at a lower rate in the second time interval 12.

Figure 4:
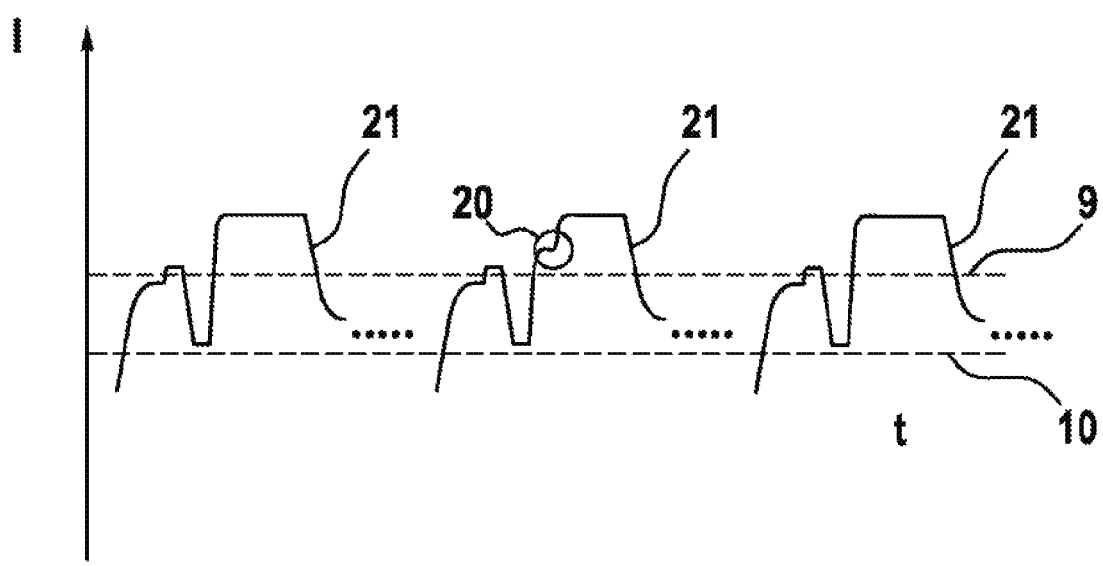
FIG. 4: a schematic waveform of a switching current when the solenoid valve of FIG. 1 repeatedly switches over from the first position to the second position.

FIG. 4 shows a schematic waveform of the switching current when the solenoid valve 1 of FIG. 1 repeatedly switches over from the first position to the second position. Three switching operations are shown here, which (as indicated by dots) are not executed immediately one after another. As in FIG. 2, here the current I is plotted against the voltage t and the real switching current 21 is shown. In the switchover operation shown on the left and right the solenoid valve 1 is switched over as desired. In the middle switchover operation, on the other hand, an artefact 20 is apparent in the real switching current 21. The artefact 20 arises due to a movement of the valve body 4 (i.e. caused by the switching of the solenoid valve 1) as a result of electromagnetic induction. This artefact 20 shows that the solenoid valve 1 is only switched over due to the second switchover current intensity $I_4$.

The invention claimed is:

1. A method for switching over a solenoid valve having a movable valve body between a first position and a second position in a first direction against a force generated by a restoring spring, the force generated by the restoring spring being in a second direction that is opposite the first direction, the method comprising:
   a) adjusting a switching current to a pre-energization current intensity in which the movable valve body remains at the first position for a first time interval; and
   b) adjusting the switching current from the pre-energization current to a first switchover current intensity for a second time interval which initiates a switchover movement of the valve body in the first direction to the second position.

2. The method as claimed in claim 1, wherein a duration of the second time interval is such that the switching over the solenoid valve has not yet been completed after the second time interval.

3. The method as claimed in claim 1, further comprising:
   c) adjusting the switching current to a damping current intensity which adjusts a speed of the switchover movement for a third time interval.

4. The method as claimed in claim 1, wherein the solenoid valve is switched over from the first position to the second position in response to the switching current having a current intensity above an upper limiting current intensity, the pre-energization current intensity being below the upper limiting current intensity.

5. The method as claimed in claim 4, wherein the pre-energization current intensity is at least 90% of the upper limiting current intensity.

6. The method as claimed in claim 1, wherein the solenoid valve is switched over from the second position to the first position in response to the switching current having a current intensity below a lower limiting current intensity, the pre-energization current intensity being above the lower limiting current intensity.

7. The method as claimed in claim 6, wherein the pre-energization current intensity is at most 110% of the lower limiting current intensity.

8. The method as claimed in claim 1, further comprising:
   d) adjusting the switching current to a second switchover current intensity which ensures that the switchover of the solenoid valve is carried out.

9. The method as claimed in claim 8, further comprising:
   monitoring for a setting of the solenoid valve at least for a duration of step d).

10. The method as claimed in claim 8, further comprising:
   repeating at least a), b), and d) to perform a multiplicity of switching operations,
   wherein, in a subsequent switching operation of the multiplicity of switching operations, the valve body is accelerated at an increased rate in the second time interval in response to a switchover of the solenoid valve being detected in step d) of at least one previous switching operation of the multiplicity of switching operations.

11. The method as claimed in claim 8, further comprising:
   repeating at least a), b), and d) to perform a multiplicity of switching operations,
   wherein, in a subsequent switching operation of the multiplicity of switching operations, the valve body is accelerated at a lower rate in the second time interval in response to no switchover of the solenoid valve being detected in step d) of at least one previous switching operation of the multiplicity of switching operations.

12. A control device for switching over a solenoid valve having a movable valve body between a first position and a second position in a first direction against a force generated by a restoring spring, the force generated by the restoring spring being in a second direction that is opposite the first direction, the control device configured to:
   a) adjust a switching current to a pre-energization current intensity in which the movable valve body remains at the first position for a first time interval; and
   b) adjust the switching current from the pre-energization current to a first switchover current intensity for a second time interval which initiates a switchover movement of the valve body in the first direction to the second position.

13. The control device according to claim 12, wherein the control device is configured to execute a computer program to adjust the switching current.

14. The control device according to claim 13, wherein the computer program is stored on a machine-readable storage medium.

* * * * *